United States Patent

Fields et al.

Patent Number: 5,125,249
Date of Patent: Jun. 30, 1992

[54] LOCK FOR GEAR SHIFT LEVER

[76] Inventors: Raythion Fields, P.O. Box 1000, Leavenworth, Kans. 66048; George Spector, 233 Broadway Rm. 3815, New York, N.Y. 10007

[21] Appl. No.: 749,961

[22] Filed: Aug. 26, 1991

[51] Int. Cl.[5] .................. E05B 37/00; G05G 5/00
[52] U.S. Cl. .......................... 70/30; 70/160; 70/202; 70/247
[58] Field of Search ............. 70/30, 49, 199–203, 70/159–162, 246, 247, 18, 226, 237

[56] References Cited

U.S. PATENT DOCUMENTS

| 1,248,011 | 11/1917 | Rhoades | 70/202 |
|---|---|---|---|
| 1,395,532 | 11/1921 | Tilden | 70/209 |
| 2,152,565 | 3/1939 | Peterson | 70/212 |
| 4,070,879 | 1/1978 | Thompson | 70/49 X |
| 4,573,332 | 3/1986 | Ma | 70/30 |
| 4,831,850 | 5/1989 | Wong et al. | 70/202 |
| 4,993,244 | 2/1991 | Osman | 70/30 |

FOREIGN PATENT DOCUMENTS

| 611262 | 3/1935 | Fed. Rep. of Germany | 70/238 |
|---|---|---|---|
| 603983 | 1/1926 | France | 70/202 |
| 608220 | 4/1926 | France | 70/202 |
| 641350 | 4/1928 | France | 70/202 |
| 912309 | 8/1946 | France | 70/203 |
| 997868 | 7/1965 | United Kingdom | 70/203 |

Primary Examiner—Lloyd A. Gall

[57] ABSTRACT

An automotive locking device is provided for a floor mounted gear shift lever in a motor vehicle which consists of an enclosure to fit over the floor mounted gear shift lever when the gear shift lever is in the park position mode. A mechanism is for retaining the enclosure in a stationary condition so that the operation of the floor mounted gear shift lever is prevented.

1 Claim, 1 Drawing Sheet

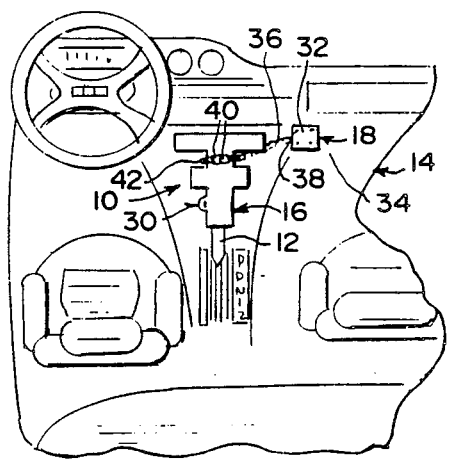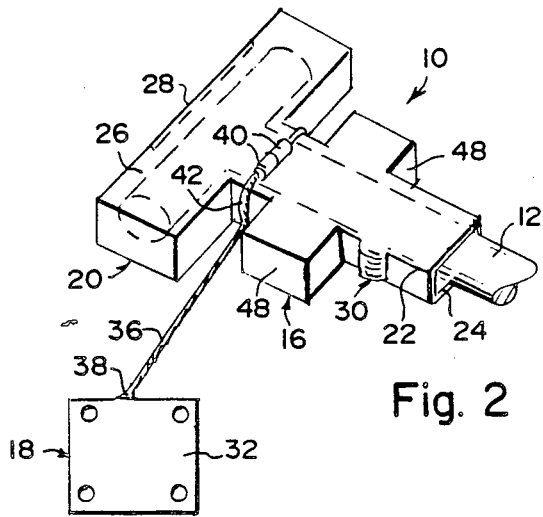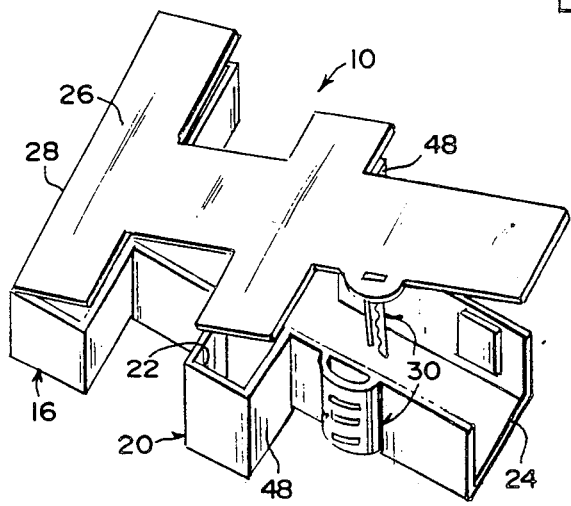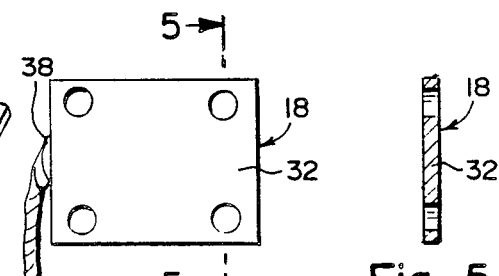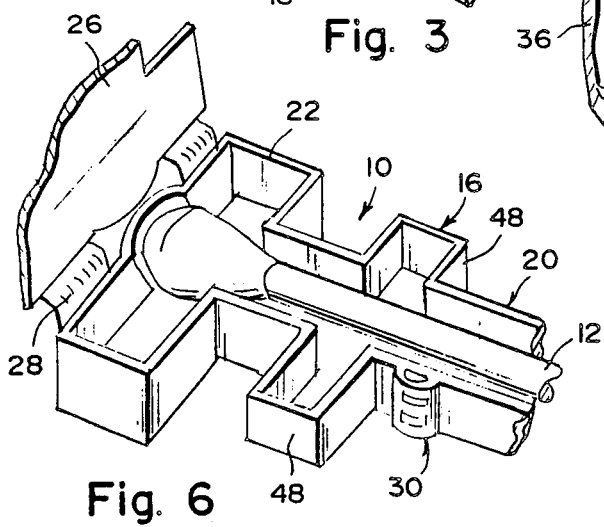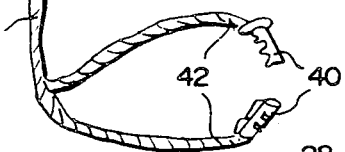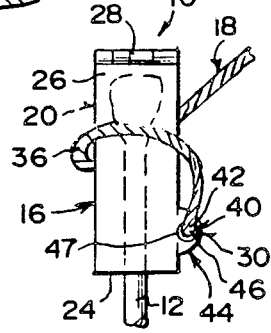

LOCK FOR GEAR SHIFT LEVER

BACKGROUND OF THE INVENTION

The instant invention relates generally to shift lever locks and more specifically it relates to an automotive locking device for a floor mounted gear shift lever which provides protection in which the vehicle cannot operate until the locking device is removed and the gear shift lever is placed into the drive position mode.

There are available various conventional lever locks which do not provide the novel improvements of the invention herein disclosed.

SUMMARY OF THE INVENTION

A primary object of the present invention is to provide an automotive locking device for a floor mounted gear shift lever that will overcome the shortcomings of the prior art devices.

Another object is to provide an automotive locking device for a floor mounted gear shift lever that will prevent the gear shift lever from being moved out of the park position mode, thereby preventing the vehicle from being operated until the locking device is removed.

An additional object is to provide an automotive locking device for a floor mounted gear shift lever that utilizes an enclosure over the gear shift lever which prevents the release of the gear shift lever from the park position mode being an automatic transmission lock-out and a retaining mechanism so that the operation of the gear shift lever is prevented.

A further object is to provide an automotive locking device for a floor mounted gear shift lever that is simple and easy to use.

A still further object is to provide an automotive locking device for a floor mounted gear shift lever that is economical in cost to manufacture.

Further objects of the invention will appear as the description proceeds.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWING FIGURES

FIG. 1 is a top view of the instant invention installed over a floor mounted gear shift lever of a motor vehicle.

FIG. 2 is a perspective view of the instant invention per se over a T-shaped gear shift lever.

FIG. 3 is a perspective view showing the lid partly opened.

FIG. 4 is a top plan view of the locking cable and plate.

FIG. 5 is a cross sectional view taken along line 5—5 in FIG. 4, through the plate.

FIG. 6 is a perspective view of a first modification for use on another type of gear shift lever.

FIG. 7 is a top plan view of a second modification to be used with a straight gear shift lever.

DETAILED DESCRIPTION OF THE PREFERRED EMBODIMENTS

Turning now descriptively to the drawings, in which similar reference characters denote similar elements throughout the several views, the FIGURES illustrate an automotive locking device 10 for a floor mounted gear shift lever 12 in a motor vehicle 14 which consists of an enclosure 16 to fit over the floor mounted gear shift lever 12 when the gear shift lever is in the part position mode. A mechanism 18 is provided for retaining the enclosure 16 in a stationary condition, so that the operation of the floor mounted gear shift lever 12 is prevented.

The enclosure 16 includes a housing 20 having an open top 22 and an open end 24, so that the housing 20 can fit about an upper end of the floor mounted gear shift lever 12. A lid 26 is sized to fit over the open top 22 of the housing 20. A hinge 28 is between the housing 20 and the lid 26 opposite from the open end 24 of the housing 20. A mechanism 30 is for locking the lid 26 to the housing 20, so as to keep the floor mounted gear shift lever 12 therein.

The retaining mechanism 18 includes a plate 32 permanently mounted to the floor 34 of the motor vehicle 14 adjacent the floor mounted gear shift lever 12, by one way bolts or other types of permanent fasteners. A cable 36 is affixed at a first end 38 to the plate 32. A mechanism 40 is provided for locking the cable at its second end 42 about the housing 20 and the lid 26 of the enclosure 16, so as to prevent the floor mounted gear shift lever 12 from going into its drive operation mode.

The lid locking mechanism 30 and the cable locking mechanism 40 in FIG. 7, are combined into a combination lock 44 that includes a male plug 46 on the second end 42 of said cable 36 and a female socket on the lid 26 and the housing 20 of the enclosure 16. When the cable 36 is wrapped about the lid 26 and the housing 20 the male plug 46 will be inserted within the female socket.

The enclosure 16, as shown in FIGS. 1, 2, 3 and 6 can be in a generally T-shaped configuration having an extension 48 on each opposite side thereof, so that the cable 36 can be wrapped therebetween. The enclosure 16, as shown in FIG. 7, can also be in a generally straight configuration. The shift lever 12 can be T-shaped as shown in FIG. 2 or straight as shown in FIGS. 6 and 7.

While certain novel features of this invention have been shown and described and are pointed out in the annexed claims, it will be understood that various omissions, substitutions and changes in the forms and details of the device illustrated and in its operation can be made by those skilled in the art without departing from the spirit of the invention.

What is claimed is:

1. An automotive locking device for a floor mounted gear shift lever in a motor vehicle which comprises:
   a) an enclosure to fit over the floor mounted gear shift lever when the gear shift lever is in the park position mode; and
   b) means for retaining said enclosure in a stationary condition, so that the operation of the floor mounted gear shift lever is prevented; wherein said enclosure includes:
   c) a housing having an open top and an open end so that said housing can fit about an upper end of the floor mounted gear shift lever;
   d) a lid sized to fit over the open top of said housing;

e) a hinge between said housing and said lid opposite from the open end of said housing;
f) means for locking said lid to said housing so as to keep the floor mounted gear shift lever therein; wherein said retaining means includes:
g) a plate permanently mounted to the floor of the motor vehicle adjacent to the floor mounted gear shift lever;
h) a cable affixed at a first end to said plate; and
i) means for locking said cable at its second end wrapped about said housing and said lid of said enclosure so as to prevent opening of said lid and moving the floor mounted gear shift lever to its drive operation mode; wherein said lid locking means and said cable locking means are combined into a combination lock that includes a male plug on the second end of said cable and a female socket on said lid and said housing of said enclosure, so that when said cable is wrapped about said lid and said housing, said male plug can be inserted within said female socket; thus locking said lid, said housing and said gear shift lever in the parking mode.

* * * * *